Feb. 6, 1973  H. J. KOEBER  3,715,161
LENS FOCUSING MECHANISM WITH MANUAL CONTROL
Filed May 28, 1971
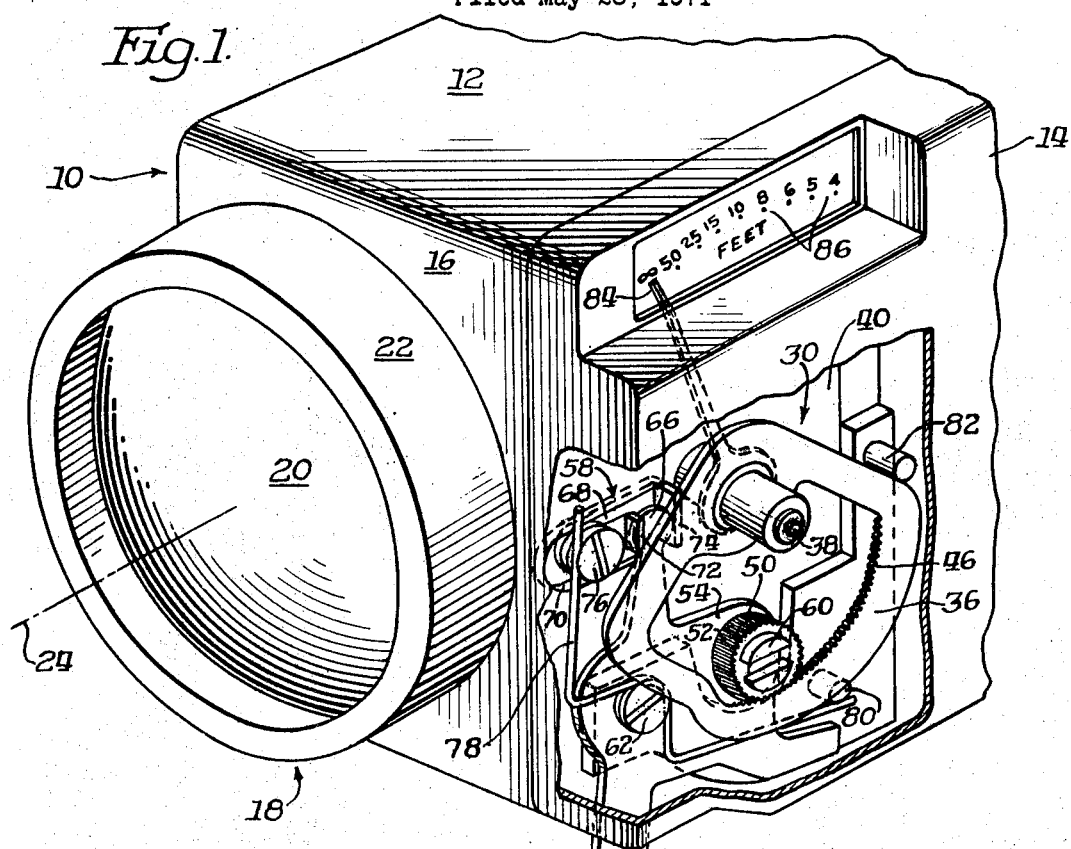
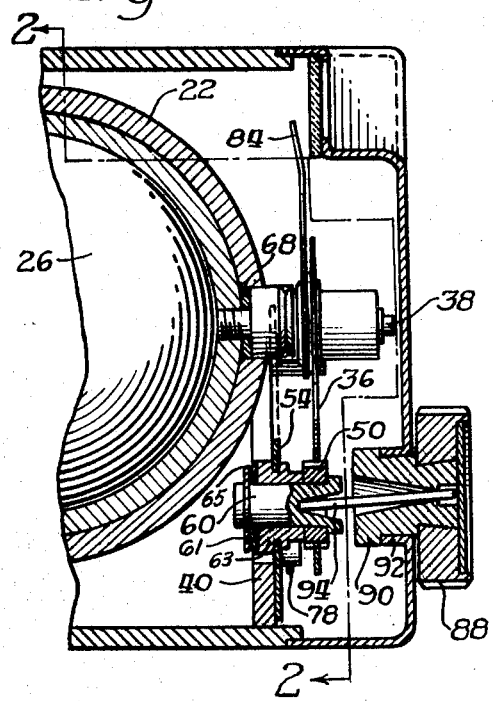
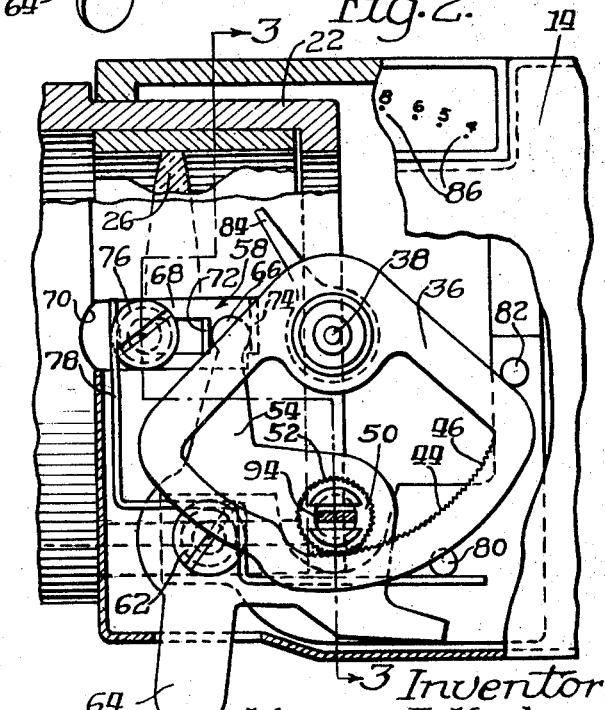
Inventor:
Henry J. Koeber.
By William F. Pusik
John E. Peele Jr. Attys United States Patent Office 3,715,161
Patented Feb. 6, 1973

3,715,161
LENS FOCUSING MECHANISM WITH MANUAL CONTROL
Henry J. Koeber, Deerfield, Ill., assignor to Bell & Howell Company, Chicago, Ill.
Filed May 28, 1971, Ser. No. 147,943
Int. Cl. G03b 3/00
U.S. Cl. 356—3
12 Claims

ABSTRACT OF THE DISCLOSURE

A distance determining mechanism for a camera having a focusable objective lens, the mechanism including a pendulous member having a cam surface formed with fine pitched teeth with which similar teeth on a cam follower cooperate to cause adjustment of the lens to a focus condition and, after adjustment, to cause substantially positive locking of the lens in adjusted position while enabling manual focusing through actuation of an externally extending focusing control.

The present invention relates to an improvement in a distance determining mechanism for an optical instrument having an objective lens which is adjustable according to focal distances, which distances are determinable by the mechanism in the form of a pendulous rangefinder functioning on the principle of triangulation. Particularly, the invention relates to a control device providing for manual focusing adjustment of the objective lens and positive locking of the lens and focusing mechanism in focused condition following an automatic focusing operation.

The triangulation principle relates to the computation of the length of one side of a right triangle, herein the camera-to-subject distance. To compute the distance, the height of either the vertical side or the length of the hypotenuse of the triangle, and one of the angles other than the right angle must be known. For use of the principle in a camera focusing arrangement, the length of the vertical side of the triangle may be empirically determined as the "height of an average adult" above the supporting plane on which the user stands. Thus, the vertical side will be approximately the same in most uses to which a camera is put. By having the user align the base of a remote subject with a reference mark in the viewfinder of the camera, the camera is caused to be angled by determinable amounts. That is, the user views the subject at the point where a vertical line through the subject intersects the supporting plane. Hence, when the optical axis of the camera's lens is angled at a given angle relative to both the vertical side and the base side of the triangle, the required values necessary to compute the unknown length of the base line are available.

The present invention belongs to a series of devices which seek to eliminate the need for mathematical computation by the user by providing a mechanism which functions to focus the lens on a semiautomatic basis. To determine the angle of inclination of the optical axis, a pendulous member orientable under the influence of gravity is arranged to pivot about an axis which extends perpendicularly of the optical axis. When the user sights the base of a subject at infinity, the optical axis remains horizontal with a base line on which both the subject and the user are effectively supported. Hence, the pendulous member remains vertical and therefore perpendicular to the horizontally oriented optical axis. However, if the user sights the base of a near subject, the optical axis and camera housing will be inclined relative to the horizontal base line. As the housing is inclined, the pendulous member will hang vertically under the influence of gravity.

In this orientation, the pendulous member is displaced from the optical axis by a given angle. Since the range of angular displacements corresponding to the range of focus planes of the lens can be determined, these values may be built into a focusing mechanism to adjust the focus of the lens for that given distance.

Prior focusing and rangefinding systems for cameras or other optical instruments have generally required manual operation by the user. Most of these systems have been of the short base variety in which the angle-defining component is within a few inches of the reference base line relative to which the angle is determined. The short base is limited by the size of the instrument's housing. Hence, extremely accurate and relatively complex mechanisms have been required to determine camera-to-subject distances. Further, these mechanisms often add significantly to the cost of the instrument since assembly and adjustment of the many parts requires this aspect of the instrument to require careful adjustment.

Although some of the more recently developed mechanisms are satisfactory for use in a semiautomatic mode, manual focusing of the objective lens by scale, based on accurate distance measurements or estimates is often desirable. These mechanisms do not permit a quick and easy manual adjustment of the objective lens in a positive manner, but require several manipulations. Further problems have existed in enabling the operator to positively establish a distance and maintain that distance should the lens be inadvertently engaged since the lens spacer element engages a smooth surfaced cam. To maintain the pendulous member in the desired small design configuration, the cam surface of the pendulous member is relatively steep and contact therebetween may be disestablished if the optical instrument is inadvertently jarred or bumped.

To overcome the above-identified problems, the present mechanism includes a pendulous member arranged for swinging movement relative to the housing of an optical instrument, such as a camera having an objective lens assembly arranged for focusing adjustment relative to a film plane in the housing. The lens focusing mechanism is connected operably to the pendulous member through a gear drive arrangement wherein the cooperating toothed surfaces are effectively locked together other than when the lens is to be focused. For semiautomatic focusing, the pressure of a toothed pinion relative to the cooperating surface of the pendulous member is released so as to permit the pendulous member to be adjusted under the influence of gravity. A positive drive is manually applicable to rotate the friction member for manual adjustment of the objective lens.

An object of the present invention is to provide a new and improved objective lens focusing mechanism including a selectively operable device permitting semiautomatic and manual focusing of the objective lens.

Another object of the invention is to provide a novel transmission mechanism to translate the position of a pendulous member into a focused condition of a lens.

Further and other objects will be apparent from the description of the accompanied drawings in which like numerals refer to like parts.

In the drawings:

FIG. 1 is a partial perspective view of an optical instrument incorporating the mechanism of the present invention, with parts broken away for clarity;

FIG. 2 is an elevational view of the mechanism of the invention taken along line 2—2 of FIG. 3.

FIG. 3 is a sectional view of the mechanism taken along line 3—3 of FIG. 2.

Referring now to the drawings, there is shown a portion of a camera 10 with a housing 12 having conventional wall portions including a side wall portion 14 and a front wall portion 16 from which an objective lens assembly 18 extends. This objective lens assembly includes an objective lens 20 positioned substantially concentrically of a lens barrel 22 and defining an optical axis 24. A lens focusing element or cell 26 (shown in FIG. 3) is supported movably in barrel 22 so that the cell moves axially of optical axis 24 to focus an image of a remote subject on a not shown film plane internal of the camera housing. This is, when "in-focus," the image of a remote subject is focused on a focal plane coincident with the film plane. A change of either the distance between the camera and the subject or of the focal plane at which the objective is focused relative to the film plane causes the image to be focused on other than the film plane. Thus, the objective lens must be capable of being focused for a range of camera-to-subject distances.

On side wall 14 of camera housing 12, a focusing mechanism 30 is mounted and arranged to cooperate with objective lens assembly 18 to enable semiautomatic adjustment of the focus of objective lens 20. The mechanism includes a pendulous member 36 mounted in such a manner that it may be released for free swinging movement about an axle 38 which is supported on a mechanism plate 40 attached within the camera housing.

When the pendulous member is in free swinging condition, it seeks a gravity oriented position responsive to the inclined orientation of the camera's optical axis 24 which defines the hypotenuse of a right triangle. The vertical line of the triangle is understood to extend vertically below the position of the camera to a point at which that line intersects the base line extending horizontally from the base of the subject along a supporting plane on which the subject and instrument user are located.

To enable the pendulous member 36 of the focusing mechanism 30 to translate the optical axis angular orientation into a distance determination, an edge 44 of the pendulous member is configured with a cam formation. As the pendulous member moves relative to a given position, radial differences of the cam surface relative to the axle 38 about which the member swings provides for distance translation. Formed along the cam edge 44 of the pendulous member is a surface having a series of fine pitched teeth 46, for cooperation with pinion 50 having a surface which includes teeth 52 of a similar pitch. When the pinion and pendulous member are in engagement with one another, the meshed gear teeth permit only positive cooperative adjustment rather than relative or sliding movement between the components. In this preferred embodiment, the pitch and depth of the teeth are, respectively, approximately .010 inch. Because the teeth are extremely fine, the objective lens is capable of smooth and substantially continuous focusing along the entire focus range.

As a portion of a control mechanism, a translator plate 54 cooperates with both the cam edges 44 of the pendulous member 36 and a lens adjusting mechanism 58 to translate the position of the pendulous member into an "in-focus" condition of the objective lens 20. The translator plate 54 supports a stub axle 60 on which the pinion 50 is fixed for rotation. The pinion 50 and the axle may be integral and rotatable as a unit. The translator plate 54 is mounted for pivotable movement about an axle pin 62 extending from mechanism plate 40. A lug portion 64 of the translator plate extends externally of the housing to be manually displaced and to physically pivot the plate 54 and the pinion 50.

About the end of the stub axle 60 which supports the pinion 50, and on the end opposite the pinion is fixed a retainer ring 61. Between the retainer ring and a bushing 63 which surrounds the axle 60 behind the pinion is a yieldable friction washer 65. The washer urges the stub axle into a restrained condition to prevent unwanted rotation of the pinion 50.

In the focusing condition, a bearing portion 66 of the translator plate 54 cooperates with the lens adjusting mechanism 58 comprising a slide 68 carried in a recess 70 in the lens barrel 22 of the objective lens 20. The silde 68, attached to the focusing lens cells 26 of the objective lens, includes a pair of spaced lugs 72, 74 between which the bearing 66 of the actuator plate 54 is received. A combination abutment portion and threaded member 76, fixed to slide 68, attaches the slide to the movable focusing cell, and is engaged by an end of a biasing member, shown as spring 78. The opposite end of spring 78 engages a limit pin 80 extending from the mechanism support plate 40.

In this preferred embodiment, the bearing portion 66 of the translator plate 54 moves the slide 68 forwardly to displace the focusing cell 26 of the lens to a focus position. Upon actuation of the translator plate to disengage the pinion 50 from the pendulous member 36, the translator plate moves the bearing and slide against the urging of the spring 78, wherein the focusing cell is displaced toward one extent of the focusing range of the objective lens. Upon release of the translator plate, the spring urges the slide and the focusing cell 26 in the opposite direction toward the other extent of the focusing range. The extent of displacement toward this latter position is determined by the return of pinion 50 into engagement with the cam surface 44 of the pendulous member. Because of the cam surface 44 of the pendulous member, the adjusted position of the translator plate 54 is varied to similarly adjust the focus of the lens to a focused condition.

A stop member 82 is fixed to mechanism support plate 40 to establish one limit of movement of pendulous member 36. Further, stop member 82 provides a manufacturing adjustment through which a reference indicator 84, fixed to move with the pendulous member 36 is adjusted relative to one end of reference scale 86. In this preferred embodiment, the reference scale is shown visible externally of the camera side wall, but may also be visible in the viewfinder of the camera.

As seen best in FIG. 3, a portion of the control mechanism is shown as a manual control knob 88 and is coupled to a carrier 90 extending through and supported in a sleeve bearing 92 formed in the side wall 14 of the camera housing. The manual control knob is coupled to the carrier by a fraction fit so that the knob may be rotated independently of the carrier when either end of the adjustment range of the pendulous member 36 has been reached.

A key member 94 couples the carrier 90 to the pendulous member engaging pinion 50 to transmit manual rotational drive to the pinion. Thus, with the actuator plate 54 in released or manual condition, rotation of the knob 88 is transmitted by the carrier, the key, and the pinion to position the pendulous member, the actuator plate and the focusing cell of the objective lens to selective orientations wherein the objective lens is focused at a desired focal distance as indicated by the reference indicator 84 relative to the scale 86.

For semiautomatic operation of the focusing mechanism 30, the manually engageable release member or tab 64 is operated to pivot translator plate 54 about axis 62. Simultaneously with the pivoting action, the lens adjusting mechanism causes focusing of the objective lens 20 at its minimum focus condition. Pivoting of the translator plate 54 raises pinion 50 from the gear teeth 46 of pendulous member 36 to permit orientation of the now free pendulous member to rotate about axle 38 under the influence of gravity. As the pendulous member is oriented, the increasing cam rise of the edge 44 is adjusted relative to the position of pinion 50 so as to be engaged upon release of the release member 64. As the pinion 50 returns into engagement or mesh with the teeth of cam surface 44, the pendulous member is locked in the adjusted position. Simultaneously as the translator plate pivots for reengagement of the pinion, the bearing 66 moves the slide 68 to focus the objective lens. The camera can now be used until additional focusing is desired at which time the above sequence is repeated.

For a manual focusing operation, the manual control knob 88 is rotated to effectively drive the pendulous member 36 and therefore to cause the distance reference member 84 to move relative to the scale 86. Because the pendulous member is provided with teeth cooperating with pinion 50, the cam edge of the pendulous member causes adjustment of the translator plate 54 about pivot 62. In turn, the bearing 66 of the translator plate adjusts slide 68 and the focusing cell 26 of the objective lens 20.

It is understood that the embodiment shown is illustrative of the principle of operation of a focusing mechanism for cameras which employ a pendulous rangefinger, and that certain changes and alterations can be made in the structure of the mechanism without departing from the spirit of the invention.

What is claimed is:

1. Improvements in a range determining device operable on the principle of triangulation for use in an optical instrument having a focusable objective lens including a focusable lens cell and defining an optical axis, and a housing orientable about a predetermined axis to orient the optical axis to an angle defining the hypotenuse of a triangle relative to the base of a remote subject, the device for adjusting the focus condition of the lens comprising:
   a pendulous member supported in said housing for adjustment under the influence of gravity when said housing is oriented to align the optical axis of said objective lens on the base of the remote subject;
   a cam surface on said pendulous member varying according to the angle of inclination of said optical axis relative to a vertical line through the subject;
   a toothed surface on said pendulous member;
   control means having a toothed member releasably engageable with said toothed surface of said pendulous member for selectively restraining said pendulous member against movement when in engagement therewith, and for permitting selective adjustment of said pendulous member from said gravity oriented position; and
   lens cell adjusting means positionable upon orientation of said cam surface of said pendulous member for focusing of said objective lens.

2. Improvements in a range determining device operable on the principle of triangulation for use in an optical instrument having a focusable objective lens defining an optical axis and, including at least one element axially displaceable for focusing, and a housing orientable about a predetermined axis to an angle defining the hypotenuse of a triangle, a pendulous member mounted in said housing for pivotal movement to positions corresponding to angular disposition of the optical axis of said objective lens with respect to the base of a remote subject, the improvement comprising:
   a cam surface on an internal surface of said pendulous member defining a varying path corresponding to the orientation of said pendulous member responsive to the angle of inclination of said housing; and
   control means including means movable into and out of engagement with said cam surface and including means for adjusting said lens focusing element to a condition responsive to orientation of the cam surface of said pendulous member.

3. A combination as in claim 2 wherein said control means is manually actuatable by means extending to the exterior of said housing.

4. A combination as in claim 2 wherein said cam surface is provided with fine pitched teeth and said engaging means of said control means is a pinion having fine pitched teeth tracking on said cam surface of said pendulous member.

5. A combination as in claim 2 wherein said cam surface of said pendulous member has a plurality of teeth formed thereon, and said pendulous member engaging means of said control means is a rotatable member having teeth of a pitch corresponding to said teeth of said pendulous member.

6. A combination as in claim 2 including means urging said control means into engagement with said pendulous member and being yieldable for manual actuation of said control means from a pendulous member engaging position.

7. A combination as in claim 2 including pivot means supporting said control means for pivotal movement, and wherein said control means includes a manually engageable portion enabling rotation of said control means about said pivot means between a semiautomatic focusing mode and a manual focusing mode.

8. A combination as in claim 2 wherein said control means includes a pinion means, and means to manually rotate said pinion means relative to said pendulous member whereby said objective lens is adjustable to "in-focus" condition.

9. A combination as in claim 2 wherein a reference indicator is drivable with said pendulous member relative to a distance scale responsive to orientation of said pendulous member.

10. A combination as in claim 2 wherein a portion of said control means positively actuates said focusing element over the range of focus of said objective lens.

11. A combination as in claim 2 wherein said control means is adjustable by manual means to orient said pendulous member and to focus said objective lens.

12. The combination in a range determining device as in claim 2 including:
   pinion means supported on said control means;
   key means operably connected with said pinion means for driving said pinion means; and
   an externally arranged manual focus knob cooperating with said pinion through said key means for adjusting said focusing element of said objective lens to a focus condition.

References Cited

UNITED STATES PATENTS

| | | | |
|---|---|---|---|
| 3,538,833 | 11/1970 | Koeber | 95—44 C |
| 3,550,516 | 12/1970 | Koeber | 95—44 C |
| 3,550,517 | 12/1970 | Mueller | 95—44 C |

WILLIAM L. SIKES, Primary Examiner

F. L. EVANS, Assistant Examiner

U.S. Cl. X.R.

95—44 C; 350—46; 356—8